UNITED STATES PATENT OFFICE.

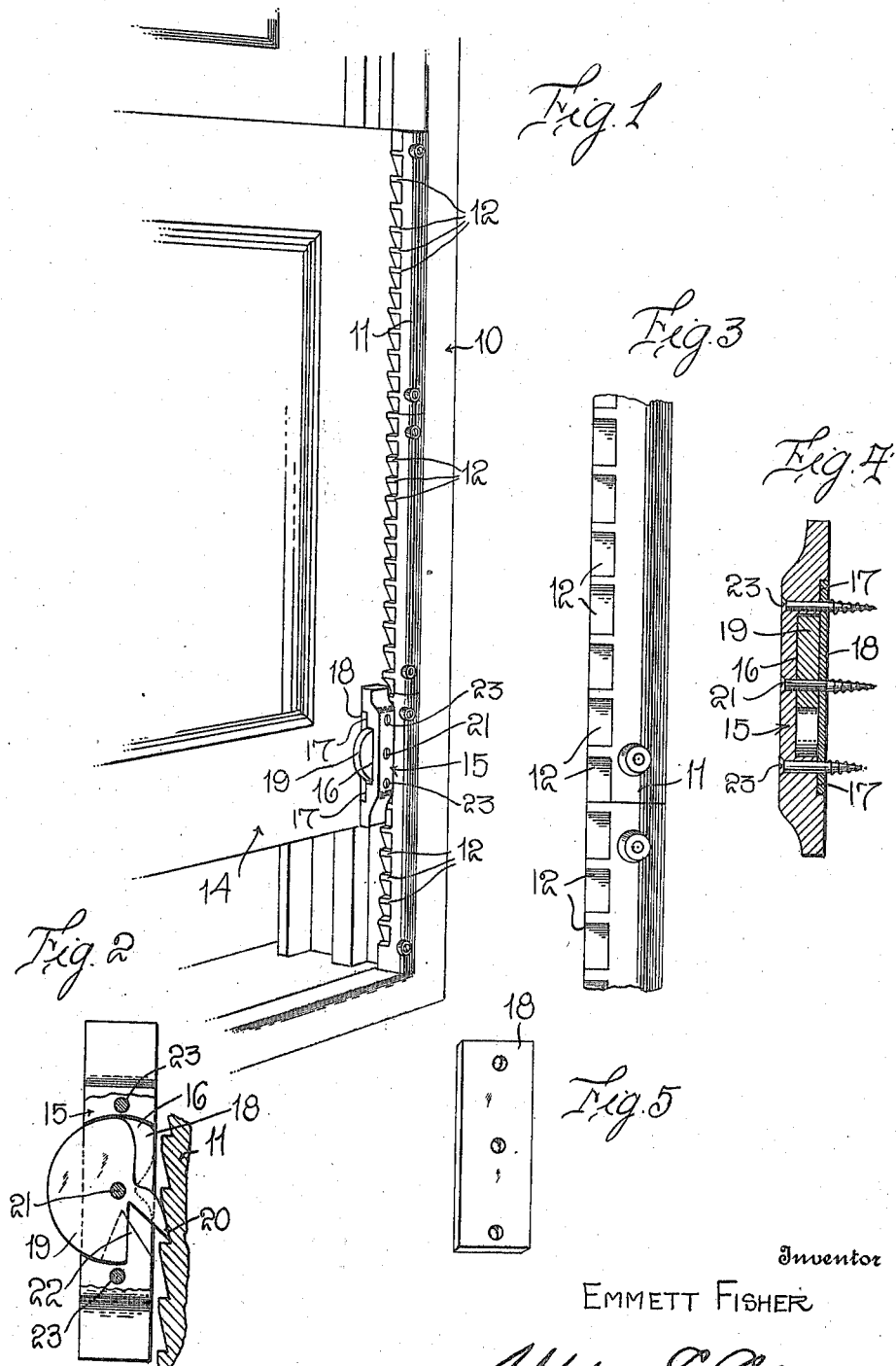

EMMETT FISHER, OF QUINCY, ILLINOIS.

SASH-FASTENER.

1,273,169.

Specification of Letters Patent.  Patented July 23, 1918.

Application filed July 5, 1917. Serial No. 178,744.

*To all whom it may concern:*

Be it known that I, EMMETT FISHER, a citizen of the United States, residing at Quincy, in the county of Adams and State of Illinois, have invented certain new and useful Improvements in Sash-Fasteners, of which the following is a specification, reference being had to the accompanying drawings.

This invention relates to devices for holding window sashes in a raised position, and particularly to that class of sash fasteners wherein the frame is provided with a rack and the window sash is provided with a detent engageable with the teeth of the rack to hold the sash at various elevations.

The object of my invention is to provide a very simple device for this purpose wherein the dog is urged to its holding position by gravity and wherein the dog is so constructed that it may be readily released from its engagement with the rack.

Other objects will appear in the course of the following description.

My invention is illustrated in the accompanying drawings, wherein:—

Figure 1 is a perspective view of a portion of a window with my holder applied thereto;

Fig. 2 is a fragmentary sectional view through the notched strip 11, the housing for the dog being broken away;

Fig. 3 is an enlarged face view of the strip 11;

Fig. 4 is a longitudinal sectional view through the housing for the dog and the dog; and Fig. 5 is a perspective view of the plate 18.

Referring to these figures, 10 designates the frame of the window provided along its entire length with a rack bar 11, which is preferably made in sections and attached to the frame in any suitable manner, this rack bar being provided with rack teeth 12. As illustrated in Fig. 2, the under faces of these rack teeth are inclined inward and downward so that the upper end of each tooth is even with the outer face of the bar.

Mounted upon the window sash 14 is the dog. The housing for this dog consists of an outer plate 15, which on its under face is recessed as at 16 and 17, the recesses 17 accommodating a lower plate 18. Disposed between the plate 18 and the wall of the recess 16 is the dog 19 which as illustrated in Fig. 2, is approximately semi-circular in form and provided with a downwardly projecting detent tongue 20. The pivot 21 for the dog is disposed eccentrically to the mass of the dog so that the dog is unbalanced and the weight outward of the pivot 21 will urge the tongue 20 inward and into engagement with the teeth on the rack. The lower end wall of the recess 16 is beveled as at 22 to form a stop for the dog. The supporting member for the dog is provided with three screws whereby it is held to the window sash. One of these screws constitutes the pivot 21 for the dog, while the other screws are designated 23.

The operation of this invention will be obvious from what has gone before. The dog will normally swing the tongue 20 inward into engagement with the teeth and it will be obvious that the sash may be thus supported at any desired elevation. When it is desired to shift the window downward, however, the finger is placed against the curved edge of the dog and the dog turns so as to carry the tongue downward and outward away from the rack. Then the window may be raised or lowered and immediately upon the release of the dog it will swing in a position to catch in the recesses or teeth.

My device may be very cheaply made, is applicable to all makes of windows and will firmly support the window at any desired elevation.

Having described my invention, what I claim is:—

A window sash fastener comprising a rack bar adapted to be mounted upon the window frame and having ratchet teeth, a supporting member adapted to be mounted upon a sash and coact with the rack bar and comprising confronting plates, a dog pivoted between said plates, the dog being approximately semi-circular in form and having a detent tongue, a screw constituting the pivot of the dog and disposed through the dog adjacent the base of the tongue whereby to cause the dog to swing by gravity to carry its detent tongue inward into engagement with the teeth, said screw passing through both of said plates, that portion of the semicircular dog diametrically opposite from the detent tongue extending laterally beyond said plates to thereby provide a curved surface with which the finger may contact to thereby shift the dog to a released position.

In testimony whereof I hereunto affix my signature in the presence of two witnesses.

EMMETT FISHER.

Witnesses:
JOSEPH WILEY,
JOHN HERLEMAN.

Copies of this patent may be obtained for five cents each, by addressing the "Commissioner of Patents, Washington, D. C."